United States Patent
Sustic et al.

(10) Patent No.: US 9,982,098 B2
(45) Date of Patent: May 29, 2018

(54) PERFORMANCE APAO HOT MELT ADHESIVES CONTAINING HIGH MELT FLOW RATE HYDROGENATED STYRENE BLOCK COPOLYMERS

(71) Applicant: Rextac LLC., Odessa, TX (US)

(72) Inventors: Andres Sustic, Odessa, TX (US); Enrico L. Buenacosa, Odessa, TX (US); James Haselman, Odessa, TX (US); James Nicholas Fowler, Odessa, TX (US)

(73) Assignee: REXtac LLC, Odessa, TX (US)

( * ) Notice: Subject to any disclaimer, the term of this patent is extended or adjusted under 35 U.S.C. 154(b) by 0 days. days.

(21) Appl. No.: 15/011,256

(22) Filed: Jan. 29, 2016

(65) Prior Publication Data

US 2016/0222258 A1    Aug. 4, 2016

Related U.S. Application Data

(60) Provisional application No. 62/109,472, filed on Jan. 29, 2015.

(51) Int. Cl.
| | | |
|---|---|---|
| *C08J 3/00* | (2006.01) | |
| *C08J 3/20* | (2006.01) | |
| *C08L 23/14* | (2006.01) | |

(52) U.S. Cl.
CPC ............... *C08J 3/005* (2013.01); *C08J 3/201* (2013.01); *C08J 2323/20* (2013.01); *C08J 2423/12* (2013.01); *C08J 2453/02* (2013.01); *C08L 23/14* (2013.01)

(58) Field of Classification Search
CPC ........ C08J 3/005; C08J 3/201; C08J 2323/20; C08J 2423/12; C08J 2453/02; C08L 23/14

USPC ......................................................... 524/314
See application file for complete search history.

(56) References Cited

U.S. PATENT DOCUMENTS

| | | | |
|---|---|---|---|
| 2011/0021102 A1* | 1/2011 | Inoue .................... | C09J 123/14 442/327 |
| 2013/0225020 A1* | 8/2013 | Flood ...................... | C08K 7/14 442/1 |

OTHER PUBLICATIONS

Kraton G1657 Polymer—http://docs.kraton.com/tl_warehouse/pdf_data_docs/DD_Thu_1062264479_474087.pdf—downloaded May 14, 2017.*

Septon 2063 polymer—http://adhesives.specialchem.com/product/p-kuraray-septon-2063?gclid=CLSg_5j_8NMCFYaPswodrM4Fsg—downloaded May 14, 2017.*

* cited by examiner

*Primary Examiner* — Ling Siu Choi
*Assistant Examiner* — Ronald Grinsted
(74) *Attorney, Agent, or Firm* — Blank Rome LLP

(57) ABSTRACT

Adding a compatible high melt flow rate (MFR), low melt viscosity, hydrogenated styrene block copolymer to amorphous poly alpha-olefins (APAOs) results in adhesives that show acceptably high elongation and tensile strength, and which, when applied by different hot melt application methods onto elastic strands, result in personal hygiene article components that perform comparably to such components assembled using just styrene block copolymer components formulated with compatible tackifiers, processing oils and other additives.

9 Claims, No Drawings

PERFORMANCE APAO HOT MELT ADHESIVES CONTAINING HIGH MELT FLOW RATE HYDROGENATED STYRENE BLOCK COPOLYMERS

CROSS-REFERENCE TO RELATED APPLICATIONS

This application claims the benefit of U.S. Provisional Application No. 62/109,472 filed on Jan. 29, 2015, the contents of which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to amorphous poly-alpha-olefin (APAO) hot melt adhesives. More particularly, it relates to improving the performance of amorphous poly-alpha-olefin hot melt adhesives for use in personal hygiene articles by the addition of high melt flow rate hydrogenated styrene block copolymers.

2. Description of the Related Art Including Information Disclosed Under 37 CFR 1.97 and 1.98

U.S. Patent Publication No. 2014/0364532 A1, entitled "High Flow Hydrogenated Styrene-Butadiene-Styrene Block Copolymers and Applications," describes a high melt flow, low viscosity, selectively hydrogenated styrene-butadiene-styrene (hSBS) or selectively hydrogenated controlled distribution styrene-butadiene/styrene-styrene (hSBSS) block copolymers, wherein the melt flow rate of said block copolymer is at least 100 g/10 min at 230° C. under 2.16 kg mass according to ASTM D1238. These block copolymers are said to have the highest melt flow rate of any styrenic block copolymer also possessing high strength and elasticity and to be useful in hot melt adhesives prepared from hSBS or hSBSS blended with polyalphaolefins, and elastic film, fiber, and nonwoven constructions using hSBS or hSBSS.

U.S. Pat. No. 5,302,675 to Sustic et al. and entitled "High Tensile Strength Amorphous 1-Butene/propylene Copolymers" discloses a process for the production of high tensile strength 1-butene/propylene copolymers by reacting 1-butene and propylene monomers in the presence of a catalyst system comprising: a) a solid supported catalyst component of the type commonly known as a Ziegler-Natta coordination polymerization catalyst; b) a trialkylaluminum co-catalyst component; and, c) an organo alkoxy silane component commonly referred to in the polyolefins industry as an external electron donor, or external donor. The butene-1/propylene copolymers have substantially improved mechanical and rheological properties which make them desirable for use in such applications as hot melt adhesives, sealants, coatings and similar applications.

The conventional use of hot-melt adhesives (HMAs) for elastic applications is based on heavily formulated styrene block copolymers (SBCs).

BRIEF SUMMARY OF THE INVENTION

Adding a compatible high melt flow rate (MFR), low melt viscosity, hydrogenated styrene block copolymer, specifically high melt flow rate hydrogenated styrene-butadiene-styrene (i.e., HMFR hSBS), to amorphous poly alpha-olefins (APAOs), such as for example, but not exclusively, propylene-butene-1 APAO copolymers, or ethylene-propylene-butene-1 terpolymers, is shown to result in adhesives that show acceptably high % elongation and tensile strength and which, when applied by different hot melt application methods onto elastic strands (such as the ones known as Spandex or Lycra), result in personal hygiene article components (for example, leg gathers, waist bands, etc.), that perform comparably to such components assembled using just styrene block copolymer components formulated with compatible tackifiers, processing oils and other additives.

The amorphous propylene-butene (APB) and/or amorphous ethylene-propylene-butene (AEPB) and the high melt flow rate hSBS are considered to be completely miscible and compatible with each other. The HMFR hSBS adds to the elastomeric properties of the APB and/or AEPB resulting in an elastic attachment adhesive with a number of desirable performance properties.

The combination of APAO and high MFR hSBS exhibits desirable adhesive properties and may be used to make laminated elastic structures and disposable absorbent articles. The adhesive compositions of the invention may be used to bond elastic strands to various non-woven substrates, and may also be used to bond one non-woven elastic laminate to another non-woven elastic laminate under various applications. For example, the adhesive may be applied in a swirl pattern, may be melt-blown, or may be applied using any technique suitable for hot-melt adhesives.

DETAILED DESCRIPTION OF THE INVENTION

The HMA subject of this invention, hereinafter "APAO elastic attachment adhesive" (or APAO-EAA), is made up of a propylene-butene-1 APAO (or APB) with a 1-butene content of about 20 wt. % to 80 wt. %, more preferably, about 30 wt. % to about 75 wt. %, much more preferably with about 40% to about 70 wt. % and most preferably with about 45 wt. % to about 65 wt. %. Such an APB may be made either in the absence or in the presence of an externally added electron donor such as for example, the alkyl silanes, or alkyl benzoates or other similar chemicals that in the polyolefins industry are known as external donors. Preferred external donors are phenyl triethoxy silane (PES or A-donor), or cyclohexyl methyl dimethoxy silane (CMDMS or C-donor). Alternatively, an ethylene-propylene-butene-1 terpolymer (or AEPB) may be used instead of the APB copolymer, or it may also be used in conjunction with APB. These AEPBs may also be manufactured in the absence or the presence of an added external donor of the type described above. This APB (and/or AEPB), is formulated with about 5 wt. % to about 40 wt. % of the high melt flow rate hSBS, more preferably from about 10 wt. % to about 35 wt. %, much more preferably with about 10% to about 25 wt. % and most preferably with no more than about 15 wt. %. The MFR of the hSBS may be higher than 1 dg/min, preferably higher than 25 dg/min, more preferably 100 dg/min or higher, and most preferably about 200 dg/min. In embodiments using the SBCs polymers described infra, the MFR of the hSBS may be as high as about 250 dg/min. There are other co-adjuvants part of the subject HMA, such as tackifiers, preferably the type that is considered compatible with the APAO components. Such tackifiers may be of the partially and/or fully hydrogenated C5, and/or the hydrogenated dicyclopentadiene (DCPD) type resins. Other components may be, for example, liquid tackifiers or plasticizers (e.g., naphthenic oils). Yet other components may also be low molecular weight (high MFR) polypropylenes, either homopolymers or ethylene-propylene copolymers, with MFRs (measured at 230° C. as per ASTM D-1238) higher than 100 dg/min, more preferably higher than 250 dg/min, most preferably higher than 1100 dg/min. Such high MFR polypropylenes (PPs) may also be selectively functionalized, such as for example, with maleic anhydride. It is contemplated that the presence of this functionalized PP at concentrations of preferably about 15 to 10 wt. % improves the performance of the adhesive by enhancing the bonding capabilities of the EAA to the thermoplastic polyurethane elastic strands (the Lycra) via hydrogen bonds or similar such interactions. Other components such as anti-oxidants and UV stabilizers may also be added as co-adjuvants.

The use of the high MFR hSBS complements the performance of the APB and/or AEPB resulting in a polymeric blend with an adequately low combined molecular weight that, when combined with the other ingredients mentioned before, results in an APAO-EAA which allows its application at lower temperatures than typical for the HMAs based on low MFR SBCs, resulting in extended thermal stability and pot life, as well as less damage to temperature-sensitive substrates (e.g., burn-through). Other benefits (such as a reduction in the use of tackifiers), will be evident to the user.

The APAO-based EAA adhesive may be formulated with some of the existing hydrogenated SBCs such as for example KRATON® G-1643 and G-1657 (Kraton Polymers U.S. LLC, 16400 Park Row, Houston, Tex. 77084) but, due to their higher molecular weight, their use is limited to no more than about 8 wt. % in a formulation due to their significant impact on the melt viscosity of the formulation. Using the new hSBS, such as for example Kraton Polymers' G-1648, allows for more latitude in the formulation of a high-performing APAO-EAA.

In addition to the use in the manufacture of personal hygiene articles, the present invention may advantageously be used, for example, in automotive components, mattresses, structural members, and other applications that may use a poly-olefinic based hot melt adhesive.

EXPERIMENTAL

The APAO elastic attachment adhesives of the invention may be prepared or manufactured by any of the known manufacturing processes commonly used throughout the HMA industry, such as those using low-shear-rate double-planetary mixers, high-shear-rate Sigma-blade mixers, turbine mixers, etc. These are known in the industry as "batch mixers." Typical blending or residence times in batch mixers may vary anywhere from about 30 minutes up to about 4 hours, although preferable mixing times may be between one hour and three hours and most preferably between one and two hours. The mixing time will also be determined by the mixing temperature. In general, the higher the temperature, the shorter the mixing times.

Other blending/mixing equipment such as single-screw and double-screw extruders, or static mixers, which are known as dynamic or continuous mixers, may also be used. As will be appreciated by those skilled in the art, any mixer that effectively blends the components of the subject HMA may be used.

When using a batch mixer, it is preferred that the mixing temperature be at least 150° C. (or about 300° F.), although higher temperatures of up to about 205° C. (400° F.) may be used, but are not preferred due to the deleterious effect of very high temperatures on the polymers' stability. With a dynamic mixer, higher temperatures may be used due to the much shorter residence times in the mixing cavity. It is preferred that the mixing be carried out in an inert atmosphere—e.g., under dry nitrogen.

The order of the mixing of the components may be varied. However, in the case of a batch mixer, it is preferred that at least 50 to 100% of the major component of the blend, the APAO (or APAOs if more than one is used), be added first to the mixing vessel. Next, thermal stabilizers may be added. In certain embodiments, the APAO may be allowed to melt or soften up before the mixing is initiated. Once the APAO has thoroughly and completely melted, the hSBS copolymer may be added and vigorous stirring/mixing may be carried out until a visual analysis/inspection of the melt confirms the absence of gels, and the appearance is that of a smooth, free-flowing melt. The high MFR sSBSs are particularly quick in melting and forming a homogeneous melt with the APAO. The time to achieve the complete melting or dissolution of the high MFR hSBS depends on both the melt temperature and also whether a low- or high-shear mixing vessel is used.

After the hSBS has been mixed with the APAO, the next component added may be the high-MFR polypropylene (neat or functionalized), which also mixes in quite efficiently, and finally the tackifiers and any liquid plasticizers, if used, may also be added. Mixing may be continued until a homogeneous blend is achieved. The contents may then be transferred to a container such as a siliconized carton, known generally as a Menasha box, or any other container that allows the quick removal of the solidified block or brick.

Mixing the components in an extruder is typically much faster, with residence times of a few minutes, instead of hours. Mixing is also quite efficient and the ribbon of molten product may be harvested in any of the forms known to those skilled in the art.

The title product may be applied by any of the methods commonly used in a diaper manufacturing process, specifically, the elastic attachment and any of the other components in a diaper that use adhesives that have elastic properties. The title product may be applied by means of what is commonly called a "nozzle" in the industry. A nozzle is any device which is capable of providing the desired pattern of adhesive on the moving web. For example, one or more suitable nozzles are commercially available from Nordson Corporation, (Westlake, Ohio). Other nozzles suitable for use in the present invention are offered by ITW Dynatec Company (Hendersonville, Tenn.). Such nozzles are typically configured to be operated between an "on position" and an "off position" to control the spray of adhesive from the nozzles. When operated in the on position, each nozzle may be configured to spray substantially the entire volumetric flow of adhesive which is independently supplied to it to more accurately control the amount and pattern of the adhesive on the moving web. The nozzles may further be configured to include air streams that may be directed to provide a desired pattern in the spray of adhesive being dispensed from each nozzle. Such air streams may provide a desired adhesive spray pattern, such as a pattern of swirls of adhesive. One of the oldest and most widely used nozzles is the controlled fiberization (CF, or spiral spray) nozzle. Some of the commercially available nozzles are offered under the tradenames Summit™, Allegro™, UFD Omega™, Signature™ and SureWrap™, to name just a few.

Some, but not exclusively, of the better-known, larger manufacturers of elastic attachment adhesives are Henkel Corp. (One Henkel Way, Rocky Hill, Conn. 06067), Bostik, Inc. (11320 W. Watertown Plank Road, Wauwatosa, Wis.

53226), and H.B. Fuller Co. (1200 Willow Lake Blvd., Vadnais Heights, Minn. 55110).

Example 1

Twenty-two hundred (2200) grams of solid Rextac E-65, a high 1-butene/propylene APAO [REXtac LLC, 2501 S. Grandview Ave., Odessa, Tex. 79766] were charged in a Charles Ross & Son Co. (Ross) double-planetary mixer heated to about 375° F. (190° C.). The lid of the mixer was lowered and a stream of dry nitrogen was initiated to achieve an inert atmosphere in the mixer. The high 1-butene/propylene copolymer was allowed to melt for about 30 minutes and then about 3000 ppm of a binary blend of a hindered phenol-type antioxidant and a phosphite stabilizer were added, followed by 200 grs of KRATON® G1643, an SEBS styrene block copolymer of about 18 MFR. The two components were thoroughly mixed after which 320 grs of Achieve™ 6936G2, a very-high MFR propylene homopolymer from ExxonMobil Chemical, were added. Finally, 280 grs of AC® 596, a maleated polypropylene wax [Honeywell International Inc. 101 Columbia Road Morristown NEW JERSEY 07962], were added to the homogeneous blend followed by 500 grs each of the liquid hydrocarbon tackifier WINGTACK® 10 [Total Petrochemicals & Refining USA, Inc. 1201 Louisiana Street, Suite 1800 Houston Tex. 77002], and Eastotac™ H130W, a hydrogenated C5 tackifier from Eastman Chemical Co. After about three hours, the homogeneous blend was harvested and collected in the aforementioned Menasha boxes. The Brookfield melt viscosity (measured at 375° F.) was about 2565 cps.

Example 2

Twenty-two hundred (2200) grams of solid Rextac E-65, a high 1-butene/propylene APAO, were charged in a Charles Ross & Son Co. (Ross) double-planetary mixer heated to about 375° F. (190° C.). The lid of the mixer was lowered and a stream of dry nitrogen was initiated to achieve an inert atmosphere in the mixer. The high 1-butene/propylene copolymer was allowed to melt for about 30 minutes and then about 3000 ppm of a binary blend of a hindered phenol-type antioxidant and a phosphite stabilizer were added, followed by 200 grs of KRATON® MD 1648, a high MFR hSBS styrene block copolymer of about 220 MFR. The two components were thoroughly mixed after which 320 grs of Achieve™ 6936G2, a very-high MFR propylene homopolymer from ExxonMobil Chemical, were added. Finally, 280 grs of EPOLENE® 43, a maleated polypropylene wax [Westlake Longview Corporation 2801 Post Oak Blvd. Houston Tex. 77056], were added to the homogeneous blend followed by 500 grs each of the liquid hydrocarbon tackifier WINGTACK® 10 from Cray Valley, and Eastotac™ H130W, a hydrogenated C5 tackifier from Eastman Chemical Co. After about three hours, the homogeneous blend was harvested and collected in the aforementioned Menasha boxes. The Brookfield melt viscosity (measured at 375° F.) was about 2180 cps.

Test Results

The subject matter products were tested using a lab-scale laminator modified in Applicants' laboratory to fit the needs of testing EA Adhesives. The adhesives were applied onto Lycra elastic strands using an Allegro™ nozzle and the strands were sandwiched between six-inch wide rolls of spun-bond PP non-woven material at a line speed of 200 fp/min and a 300% elongation of the elastic strands. The adhesive was applied at 335° F. to 350° F. and at coat weights, or add-ons, of 30, 45 and 60 mg/m.

The so-obtained laminates were tested by determining the percent creep, (% Creep) after 10 minutes, and after conditioning the laminates for 90 min. at 100° F. Table 1 below lists some of the results obtained.

TABLE 1

Percent Creep of Laminates Made With Some of the Subject Matter Products.

| | Initial Creep | | | |
|---|---|---|---|---|
| Sample ID | 10 - mins | After 90-mins @ 100° F. | % Creep, Intial 10 mins | After 90 mins @ 100° F. |
| 30 mg/m | | | | |
| Example 1 | 166 | 113 | 8% | 53% |
| Example 2 | 173 | 168 | 2% | 6% |
| 45 mg/m | | | | |
| Example 1 | 175 | 168 | 0% | 6% |
| Example 2 | 175 | 175 | 0% | 0% |
| 60 mg/m | | | | |
| Example 1 | 175 | 172 | 0% | 3% |
| Example 2 | 175 | 175 | 0% | 0% |

The two columns on the left under "Initial Creep" list the initial length of the strands after 10 minutes at ambient temperature and after 90 minutes at 100° F. The two columns on the right under "Initial Creep" show the calculated percent creep. It is apparent that Example 2, which was formulated with the high melt flow rate (HMFR) hSBS styrene block copolymer, has lower percent creep than Example 1, which was made with a lower melt flow rate (MFR) styrene block copolymer. In general, lower percent creep is desired.

The foregoing presents particular embodiments of a system embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:
1. A hot-melt adhesive comprising:
   at least one amorphous poly alpha-olefin;
   a hydrogenated styrene block copolymer that is compatible with the amorphous poly alpha-olefin and that has a melt flow rate (MFR) of at least 19 g/10 min measured at 230° C. and 2.16 kg mass; and
   a polypropylene homopolymer that has an MFR of at least 100 decigrams (dg)/min measured at 230° C. and 2.16 kg mass,
   wherein the hot-melt adhesive comprises greater than zero and less than 10 wt. % hydrogenated styrene block copolymer.
2. The hot-melt adhesive recited in claim 1 wherein the hydrogenated styrene block copolymer is hydrogenated styrene-butadiene-styrene.
3. The hot-melt adhesive recited in claim 1, further comprising a maleated polypropylene wax.

4. The hot-melt adhesive recited in claim 1, wherein the hot-melt adhesive comprises greater than zero and less than about 8 wt. % hydrogenated styrene block copolymer.

5. The hot-melt adhesive recited in claim 1, wherein the at least one amorphous poly alpha-olefin is a 1-butene/propylene amorphous poly alpha-olefin.

6. A hot-melt adhesive comprising:
about 55 wt. % of at least one amorphous poly alpha-olefin;
about 5 wt. % of a hydrogenated styrene block copolymer that is compatible with the amorphous poly alpha-olefin and that has a melt flow rate (MFR) of at least 19 g/10 min measured at 230° C. and 2.16 kg mass;
about 8 wt. % of a polypropylene homopolymer that has an MFR of at least 100 dg/min measured at 230° C. and 2.16 kg mass;
about 7 wt. % of a maleated polypropylene wax;
about 12.5 wt. % of a liquid hydrocarbon tackifier; and
about 12.5 wt. % of a hydrogenated C5 tackifier.

7. The hot-melt adhesive recited in claim 6, wherein the at least one amorphous poly alpha-olefin is a 1-butene/propylene amorphous poly alpha-olefin.

8. The hot-melt adhesive recited in claim 6, wherein the hydrogenated styrene block copolymer is an SEBS styrene block copolymer.

9. The hot-melt adhesive recited in claim 6, wherein the hydrogenated styrene block copolymer is a hydrogenated styrene-butadiene-styrene block copolymer.

* * * * *